US009177341B2

(12) United States Patent
Wiggins et al.

(10) Patent No.: US 9,177,341 B2
(45) Date of Patent: *Nov. 3, 2015

(54) DETERMINING SEARCH RELEVANCE FROM USER FEEDBACK

(71) Applicant: Amazon Technologies, Inc., Seattle, WA (US)

(72) Inventors: Kelly L. Wiggins, Seattle, WA (US); Llewellyn J. Mason, Seattle, WA (US); Olga I. Kuznetsova, Seattle, WA (US); Peter V. Commons, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/540,243

(22) Filed: Nov. 13, 2014

(65) Prior Publication Data

US 2015/0127491 A1    May 7, 2015

Related U.S. Application Data

(63) Continuation-in-part of application No. 13/216,031, filed on Aug. 23, 2011, now Pat. No. 8,903,817, and a continuation-in-part of application No. 13/216,065, filed on Aug. 23, 2011, now abandoned.

(51) Int. Cl.
*G06F 17/30* (2006.01)
*G06Q 30/06* (2012.01)
*G06Q 30/02* (2012.01)

(52) U.S. Cl.
CPC ...... *G06Q 30/0625* (2013.01); *G06F 17/30648* (2013.01); *G06F 17/30702* (2013.01); *G06F 17/30864* (2013.01); *G06F 17/30637* (2013.01); *G06F 17/30873* (2013.01); *G06Q 30/02* (2013.01)

(58) Field of Classification Search
CPC ............ G06F 17/30864; G06F 17/30637; G06F 17/30648; G06F 17/30873; G06Q 30/02
USPC .................................. 707/722, 728, 731
See application file for complete search history.

(56) References Cited

U.S. PATENT DOCUMENTS

| 7,596,558 B2 | 9/2009 | Brewer et al. |
| 8,150,843 B2 | 4/2012 | Chitiveli et al. |
| 8,195,637 B1 | 6/2012 | Datar et al. |
| 2005/0004889 A1 | 1/2005 | Bailey et al. |
| 2007/0073592 A1 | 3/2007 | Perry et al. |
| 2007/0288439 A1 | 12/2007 | Rappaport et al. |
| 2008/0016034 A1 | 1/2008 | Guha et al. |
| 2008/0086688 A1 | 4/2008 | Chandratillake et al. |

(Continued)

OTHER PUBLICATIONS

The Authoritative Dictionary of IEEE Standards Terms, 7th Edition, 2000, p. 1072.

(Continued)

*Primary Examiner* — Rehana Perveen
*Assistant Examiner* — Tiffany Thuy Bui
(74) *Attorney, Agent, or Firm* — Thomas Horstemeyer, LLP

(57) ABSTRACT

Disclosed are various embodiments for using relevance indications provided by a user in performing a search. Search results corresponding to a search query are provided to a user of a client computing device. The user provides a relevance indication corresponding to relevance of at least one of the search results. A subsequent search is performed which takes the relevance indication into account.

20 Claims, 7 Drawing Sheets

(56) References Cited

U.S. PATENT DOCUMENTS

| | | |
|---|---|---|
| 2009/0171929 A1 | 7/2009 | Jing et al. |
| 2009/0228447 A1 | 9/2009 | Creekbaum et al. |
| 2010/0010895 A1 | 1/2010 | Gabrilovich et al. |
| 2010/0036806 A1 | 2/2010 | Lam et al. |
| 2010/0125573 A1 | 5/2010 | Venolia |
| 2010/0161591 A1 | 6/2010 | Jones et al. |
| 2010/0235354 A1 | 9/2010 | Gargaro et al. |
| 2010/0250336 A1 | 9/2010 | Selinger et al. |
| 2010/0312782 A1 | 12/2010 | Li et al. |
| 2011/0145234 A1 | 6/2011 | Hu |
| 2011/0153551 A1 | 6/2011 | Gabriel et al. |
| 2011/0173217 A1 | 7/2011 | Kasperski |

OTHER PUBLICATIONS

Product Advertising API Developer Guide AP, Aug. 1, 2011, pp. 1 and 81-83.

Continuation-in-part U.S. Appl. No. 13/216,065, filed Aug. 23, 2011, entitled "Filtering Search Results Using Relevance."

Continuation-in-part U.S. Appl. No. 13/216,031, filed Aug. 23, 2011, entitled "Determining Search Relevance from User Feedback."

DETERMINING SEARCH RELEVANCE FROM USER FEEDBACK

CROSS REFERENCE TO RELATED APPLICATION

This application is a continuation-in-part of and claims the benefit of U.S. Pat. No. 8,903,817, filed Aug. 23, 2011, entitled "Determining Search Relevance from User Feedback," and a continuation-in-part of and claims the benefit of U.S. patent application Ser. No. 13/216,065, filed on Aug. 23, 2011, and subsequently abandoned, entitled "Filtering Search Results Using Relevance," all of which are incorporated herein by reference in their entireties.

BACKGROUND

Online shoppers interact with product search engines to find products of interest and obtain information about those products. The product search engine returns summary information for products that most closely match a user's search query. The user then selects a link associated with one of the search results to get more information about a product. Some electronic commerce sites also include a product catalog, or taxonomy. In addition to using the product search engine, a user can navigate through this hierarchical catalog to obtain information about products.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to relevance of search results to a search query. A user interacts with a search client to request searches from a search engine and then to provide explicit indications as to which search results are relevant. This relevance indication data is stored for use in future searches. As subsequent searches are performed, by the same user and/or by other users, the search engine learns which results are relevant in a direct manner, guided by explicit information provided by the user. Such explicit relevance data may be used in conjunction with implicit relevance data that is derived from tracking user interaction with search results.

A search engine can also use a relevance threshold provided by a user to filter search results produced by a search query. For example, the user may apply a loose filter by providing a threshold value that instructs the search engine to include all search results that meet even a minimum relevance score. As another example, the user may apply a strict filter by providing a threshold value that instructs the search engine to include only those search results that meet a maximum relevance score. As yet another example, the user may apply a threshold value that instructs the search engine to include some but not all of the relevant search results. In some embodiments, the user can choose a particular item in an initial list of search results and specify that only search results more relevant than the chosen item should be presented in the refined list of search results.

The filtered search results may be sorted according to one or more criteria. The use of a relevance threshold in combination with sorting helps improve the user experience by excluding less relevant search results from those search results immediately visible to the user, for example, on a first page of search results. For example, when items are sorted by price but no relevance threshold is used, relatively expensive yet less relevant items are presented on the first page of search results. When the user adjusts the relevance threshold, items that are less related to the item of interest (e.g., camera accessories rather than cameras) are excluded.

In the following discussion, a general description of the system and its components is provided, followed by a discussion of the operation of the same.

Figure 1:
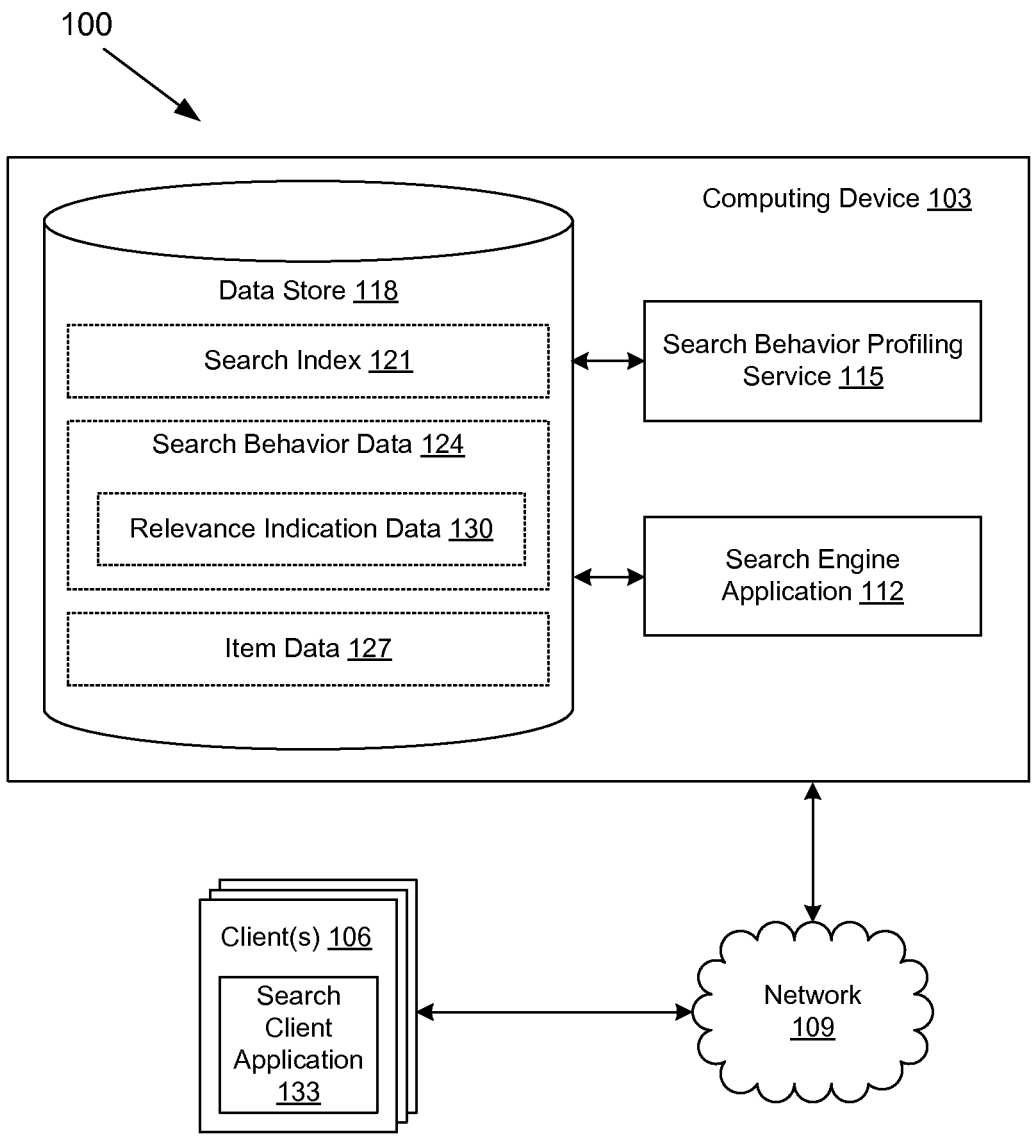
FIG. 1 is a drawing of a networked environment according to various embodiments of the present disclosure.

With reference to FIG. 1, shown is a networked environment 100 according to various embodiments. The networked environment 100 includes a computing device 103 that is in data communication with one or more clients 106 by way of a network 109. The network 109 may include, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. To this end, a plurality of computing devices 103 together may comprise, for example, a cloud computing resource, a grid computing resource, and/or any other distributed computing arrangement. Such computing devices 103 may be located in a single installation or may be dispersed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. The components executed on the computing device 103, for example, include a search engine application 112, a search behavior profiling service 115, and other applications, services, processes, systems, engines, or functionality not discussed in detail herein. Also, various data is stored in a data store 118 that is accessible to the computing device 103. The data store 118 may be representative of a plurality of data stores 118 as can be appreciated. The data stored in the data store 118, for example, is associated with the operation of the various applications and/or functional entities described below.

The search engine application 112 is executed in the computing device 103 to search for items which match a search query. Execution of a search query produces a set of items matching the query, referred to as search results. The search engine application 112 may also be executed to encode for rendering by the client 106 at least one network page that includes a list containing some or all of the items generated in response to the search query. Each of the items in the list may include a link to a corresponding network page for the item. The search engine application 112 may be a general-purpose search engine that operates to search the Internet as a whole, or may be a site-specific search engine that is limited to searching one or more network sites.

The search behavior profiling service 115 may be executed to generate profiles describing search behavior. Various data sources may be used in generating the search profiles. In various embodiments, the search engine application 112 and the search behavior profiling service 115 may comprise a single application or may be distributed into any number of applications or components.

The data stored in the data store 118 may include, for example, a search index 121, search behavior data 124, item data 127, and/or potentially other data. The search index 121 is an indexed data structure that allows the search engine application 112 to find, in a computationally efficient manner, documents, files, catalog items, images, audio, and/or video which match a search query.

The search behavior data 124 may include various information that describes past behavior, across multiple users, with respect to searching and/or browsing for items, documents, etc. Such information may be aggregated and indexed for each item, document, etc. in a search result. Thus, the search behavior data 124 may comprise data describing the association between particular search queries and particular search results. The search behavior data 124 may be generated, for example, by the search behavior profiling service 115 from previous search queries, from item sales data, from network page view data, and/or other data.

The search behavior data 124 includes a particular type of search behavior data, referred to herein as relevance indication data 130. Relevance indication data 130 captures input explicitly provided by a user about the relevance of a particular search result to a particular search query. Thus, while the search engine application 112 may process search behavior data 124 to derive information about the relevance of search results to search queries, the relevance indication data 130 provides instead a direct indication of what users find to be relevant. The search behavior data 124 may take both types of relevance information (explicit and implicit) into account when determining which items or documents to include in a set of search results.

The search engine application 112 may reference item data 127, where the item data 127 may include, for example, item titles, item images, item descriptions, item prices, item quantities, item reviews, item concepts, related items, accessory items, compatible parts for that item, and/or any other data that may be used to describe or otherwise relate to items that are searchable by the search engine application 112. The items represented in item data 127 may be organized as a catalog (not shown), which may be structured as a hierarchy.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, a set-top box, a music player, a video player, a media player, a web pad, a tablet computer system, a game console, or other devices with like capability. The client 106 may be configured to execute various applications such as a search client application 133 and/or other applications. The search client application 133 may be implemented as a standalone application, may execute in the context of a browser to access and render network pages, such as web pages, or other network content. The client 106 may be configured to execute applications beyond the search client application 133 such as, for example, email applications, instant message applications, and/or other applications.

Next, a general description of the operation of the various components of the networked environment 100 is provided. To begin, users request the search engine application 112 to perform searches using different search queries, and the search engine application 112 provides search results in response to these search queries. As these searches are performed, the search behavior profiling service 115 may be executed periodically, or in response to some other trigger, in order to generate search behavior data 124 and/or other data.

As users enter search queries and browse through search results, the search behavior profiling service 115 may capture within the search behavior data 124 the search queries and associated navigation actions that led users to particular items. The occurrence of more instances of a user reaching a particular item through a particular query leads to a stronger association between the query and the item. In this manner, the search behavior profiling service 115 may use the search behavior data 124 to infer the relevance of particular items in connection with particular search queries. As a non-limiting example, an item search using a particular search query and/or search context may return a list of items. When users select an item from the list of items, that item may be deemed more relevant to, or having a stronger association with, that particular search query and/or search context than the other items. When users take a further action such as, for example, ordering the item, viewing a network page associated with the item, ordering a related item, etc., the item may be considered even more relevant.

While some types of search behavior data 124 thus implicitly describe search relevance, the search engine application 112 also tracks relevance indication data 130, which provides an explicit indication, provided directly by a user, as to which search results are considered relevant to a particular search query. The search engine application 112 uses this relevance indication data 130 in order to decide which search results are presented to the user.

A user at a client 106 may access a network page from the search engine application 112 on the computing device 103. It is understood that the network page may be provided instead by some other network page server application executing on the computing device 103. The network page may include a form for inputting a search query from the user to the search engine application 112. To this end, the search client application 133 may render, for example, a type of form input field (text, text area, etc.), a search button, and/or other form components. The user may input the search query into the input field in the network page rendered by the search client application 133 and then submit the search query to the search engine application 112.

In response to the search query, the search engine application 112 generates a set of search results that are deemed to be the most relevant. The search results may be ranked based on a relevance score. As noted above, the search engine application 112 may use the search behavior data 124, including the relevance indication data 130, to determine relevance. The search engine application 112 may also use item data 127 (e.g., title, description, etc.) and search behavior data 124 in making a relevance determination.

The search engine application 112 may determine relevance by selecting those results that meet a relevance threshold, where this relevance threshold is not a predetermined value, but is instead set dynamically as the point at which relevance scores for results in the set begin to significantly decline. In this manner, the search engine application 112 excludes from the search results those items in the set that have a relevance score that is less than this dynamically determined drop-off.

The search engine application 112 then provides the search results to the client 106. In some embodiments, the search engine application 112 may generate one or more network pages including the search results, and send these network pages over the network 109. A search client application 133 or other application executing on the client 106 then renders the network page(s) for display to a user. The user interacts with the search client application 133 to provide explicit indications as to which search results are relevant, and the search engine application 112 stores this information as relevance indication data 130. As subsequent searches are performed, by the same user and/or by other users, the search engine application 112 learns which results are relevant not only by deriving an understanding of implicit relevance, but in a direct manner, guided by explicit information provided by the user.

In addition, or alternatively, the user interacts with the search client application 133 to provide the search engine application 112 with a search relevance threshold value. This threshold allows the user to specify how important relevance should be in determining which items appear in the search results. For example, a threshold value may indicate that only minimum relevance should be required to include a particular item in the search results. As another example, a threshold value may indicate that only items with a maximum relevance score should appear in the search results. The search client application 133 uses this search relevance threshold value to filter or refine the full set of search results. The refined set of search results is then provided to the search client application 133 to be rendered for display to the user. In addition to filtering by the relevance threshold, the search client application 133 and/or the search engine application 112 may perform sorting by various criteria such as price, popularity, etc.

In certain embodiments, the search relevance threshold value, the relevance score, or both, may be based on or take into account the search behavior data 124, including the relevance indication data 130. In some embodiments, the search relevance threshold value may be based on individualized relevance indication data 130, or aggregated relevance indication date 130. This allows users to search or filter results based on results that are relevant to the individual user versus results that are relevant to the general population. For example, relevance indication data 130 may be collected on a per user basis. This may be used to surface search results based on an individualized search relevance threshold. Relevance indication data 130 for multiple users may also be aggregated to generate a generalized search relevance threshold that identifies the relevance of search results generally.

Figure 2A:
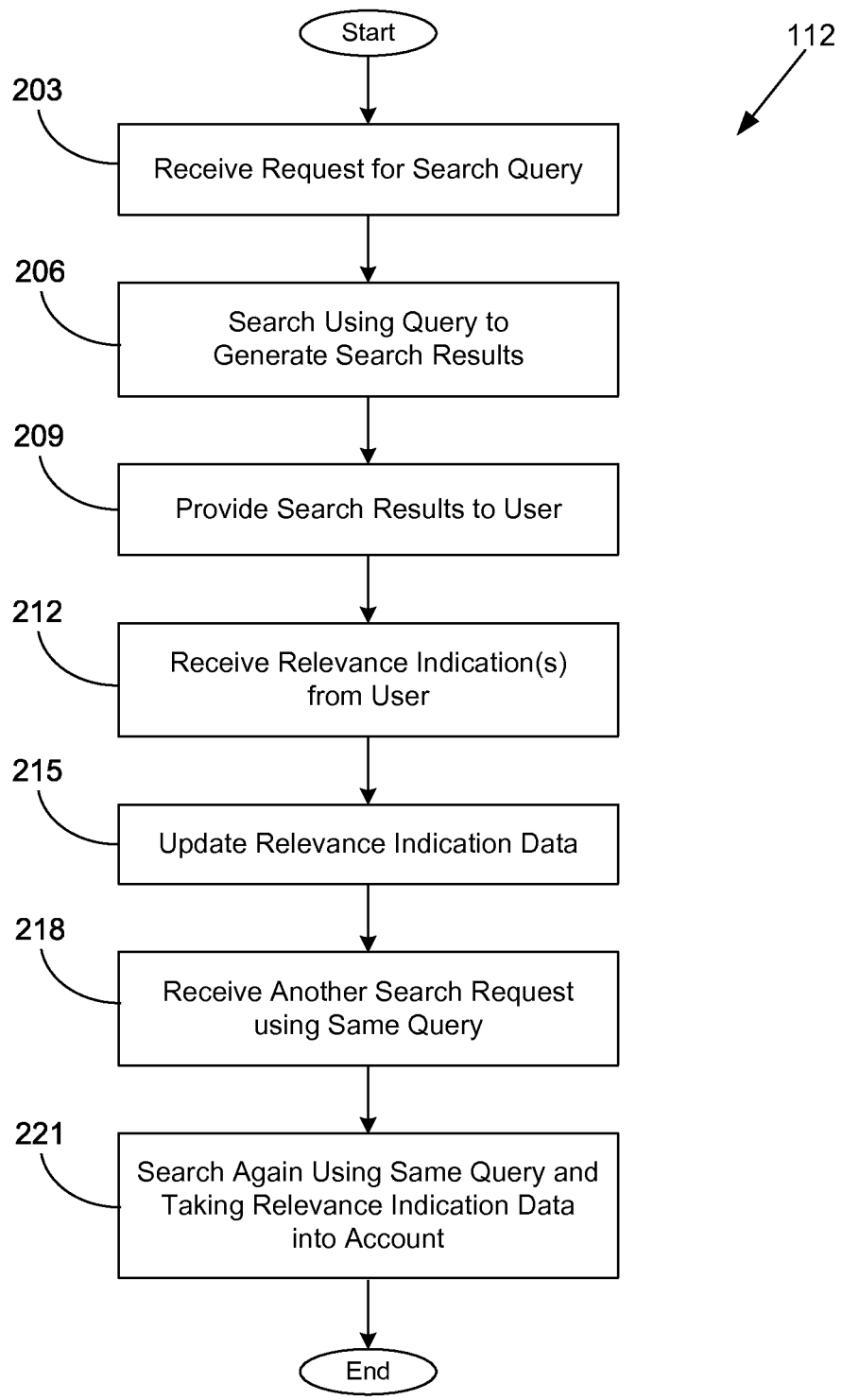
FIG. 2A is a flowchart illustrating one example of functionality implemented as portions of a search engine application executed in a computing device in the networked environment of FIG. 1 according to various embodiments of the present disclosure.

Referring next to FIG. 2A, shown is a flowchart that provides one example of the operation of a portion of the search engine application 112 according to various embodiments. It is understood that the flowchart of FIG. 2A provides merely an example of the many different types of functional arrangements that may be employed to implement the operation of the portion of the search engine application 112 as described herein. As an alternative, the flowchart of FIG. 2A may be viewed as depicting an example of steps of a method implemented in the computing device 103 (FIG. 1) according to one or more embodiments.

Beginning with box 203, the search engine application 112 receives a search request, including a search query, from a client 106 (FIG. 1) over the network 109 (FIG. 1). The search query includes one or more search terms (also referred to as "keywords") and may include connectors (e.g., AND, OR, NOT, NEAR, etc.) or restrictions such as date, language, etc. The search query may be entered in a search client application 133, or entered into a text form within a browser executing on the client 106, or provided by some other method. As a non-limiting example, the search query may be transmitted from the client 106 to the search engine application 112 by way of a hypertext transfer protocol (HTTP) GET, POST, PUT, and/or other request.

Next, at box 206, the search engine application 112 performs a search using the search query obtained in box 203, producing a set of search results. The set of results may be generated by identifying potential results that match one or more of the terms in the query. For example, a network page containing one or more terms within the search query may be included in the set of search results. Similarly, a network page tagged with one or more terms, such as metadata descriptors including one or more of the search terms, may be included in the set of search results.

At box 209, the search engine application 112 provides the search results to the requesting client 106. As a non-limiting example, the search results may be provided in the form of a network page, which may include links to other network pages. In such embodiments, the search engine application 112 may encode the network page for rendering by the client 106 and sends the network page to the client 106 by way of the network 109. In some embodiments, only a portion of the search results are provided on a particular network page, with additional portions of the search results being provided upon user request. Breaking up the search results in this manner may reduce latency when a large number of search results are involved.

At box 212, the search engine application 112 receives an indication from the user of the relevance of one or more of the search results. In one embodiment, the network page of search results includes a user control corresponding to each entry in the list of search results, and the user interacts with this control to indicate the degree of relevance a particular result has to the search query. In some embodiments, the relevance indication is binary, indicating relevant or irrelevant. In other embodiments, the relevance indication supports more than two values.

Next, at box 215, the search engine application 112 updates the relevance indication data 130 (FIG. 1) in the data store 118 (FIG. 1) to include the indications received at box 212. As described earlier, the relevance indication data 130 captures the relevance of terms in a search query to a particular search result. The relevance indication data 130 is aggregated across searches and/or users. In some embodiments, the relevance indication data 130 may also be stored on a per user or other individualized basis.

At box 218, the search engine application 112 receives a request for another search and at box 221, the search engine application 112 performs another search using the search query received at box 218. The subsequent search performed at box 221 takes into account the specific relevance indication associated with the search query and with the results obtained at box 212. The subsequent search may be performed by the same user or a different user. The subsequent search may be performed in the same session or a different session. The process of FIG. 2A is then complete. Although not shown in the flow chart of FIG. 2A, the results of the subsequent search are also provided to the user, as should be appreciated.

In some use cases, the search query used in the subsequent search is the same as, or is similar to, or has some overlap with, the search query used in the search of box 206. In the conventional approach to searching, where no relevance indication is used, such a search would be expected to produce essentially the same set of search results, including ones that the user views as irrelevant. However, because the relevance indication is taken into account during the subsequent search at box 221, the embodiments disclosed herein provide an improved user search experience.

In some embodiments, the search engine application 112 takes the relevance indication into account by updating the search index 121 (FIG. 1) to include the relevance indication. The user has already provided a relevance indication for a particular search result. The search engine application 112 identifies the search index entry corresponding to that search result and further corresponding to one or more search terms present in the search query. The search engine application 112 then modifies the search importance value for that index. In some embodiments, the modification is a reduction in value. In some embodiments, the search importance value is downweighted, such that the amount of reduction is proportional to the total number of relevance indications for that search result. In this manner, when a user viewing results for the search query "green AND apple" indicates that "Snow White" is an irrelevant search result, the entry in the search index 121 corresponding to the combination "green AND apple" is updated so that the result "Snow White" is less relevant. In this manner, the next search for "green AND apple" is less likely to include the result "Snow White." The modification to the search importance value may be conditioned on a predetermined number of indications of irrelevance, so that "Snow White" is not removed after an irrelevance indication from a single user, but instead is removed after irrelevance indications from multiple users. The predetermined number may be expressed in various ways, for example, as an absolute value, as a proportion, or as a percentage.

In some embodiments, the search engine application 112 operates to search specifically for items in a catalog rather than to search generally for documents on a network. In this sense, the search is a closed search rather than an open-ended search. In such embodiments, the search engine application 112 may use the relevance indication data 130 to update item data 127 in the catalog. Thus, when a user viewing results for the search query "camera" indicates that "8 MB memory card" is an irrelevant search result, the item data 127 may be updated to remove the "camera" attribute from the "8 MB memory card" item. This removal may be conditioned on a predetermined number of indications of irrelevance, so that "camera" is not removed after an irrelevance indication from a single user, but instead is removed after an irrelevance indication from multiple users.

In some embodiments, the search engine application 112 takes the relevance indication into account while searching by flagging search terms in the search query for further investigation. This further investigation may involve human effort, for example, a person may determine whether or not the irrelevant search result should be removed from the search index 121. The flagging may be conditioned on a predetermined number of indications of irrelevance, so that "Snow White" is not removed because of an irrelevance indication from a single user, but instead is removed after an irrelevance indication from N users. The predetermined number may be expressed in various ways, for example, as an absolute value, as a proportion, or as a percentage.

Figure 2B:
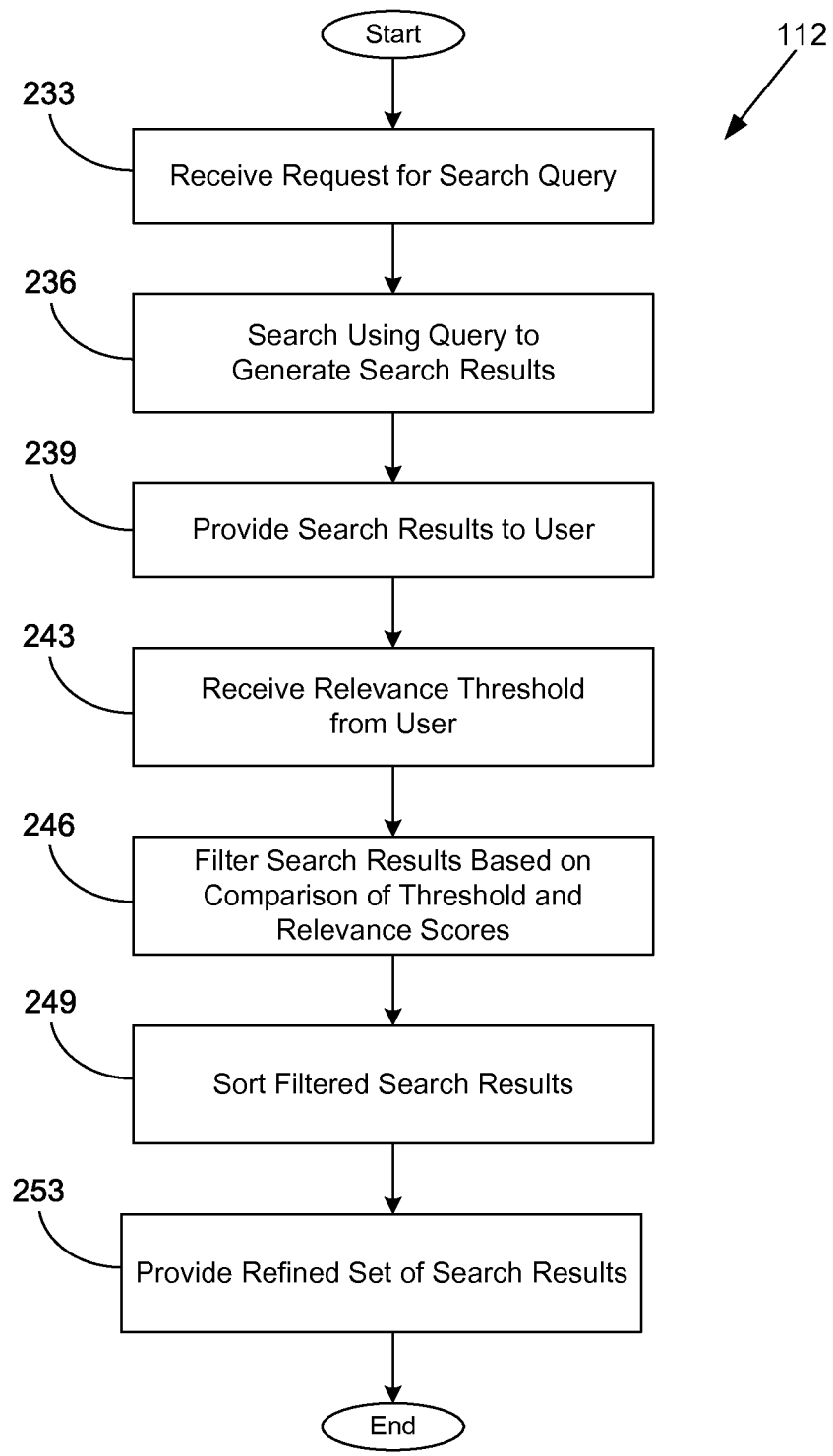
FIG. 2B is a flowchart illustrating one example of functionality implemented as portions of a search engine application executed in a computing device in the networked environment of FIG. 1 according to various embodiments of the present disclosure.

Referring next to FIG. 2B, shown is a flowchart that provides one example of the operation of a portion of the search engine application 112 according to various embodiments. It is understood that the flowchart of FIG. 2B provides merely an example of the many different types of functional arrangements that may be employed to implement the operation of the portion of the search engine application 112 as described herein. As an alternative, the flowchart of FIG. 2B may be viewed as depicting an example of steps of a method implemented in the computing device 103 (FIG. 1) according to one or more embodiments.

Beginning with box 233, the search engine application 112 receives a search request, including a search query, from a client 106 (FIG. 1) over the network 109 (FIG. 1). The search query includes one or more search terms (also referred to as "keywords") and may include connectors (e.g., AND, OR, NOT, NEAR, etc.) or restrictions such as date, language, etc. The search query may be entered in a search client application 133, or entered into a text form within a browser executing on the client 106, or provided by some other method. As a non-limiting example, the search query may be transmitted from the client 106 to the search engine application 112 by way of a hypertext transfer protocol (HTTP) GET, POST, PUT, and/or other request.

Next, at box 236, the search engine application 112 performs a search using the search query obtained in box 233, producing a set of search results. The set of results may be generated by identifying potential results that match one or more of the terms in the query. For example, a network page containing one or more terms within the search query may be included in the set of search results. Similarly, a network page tagged with one or more terms, such as metadata descriptors including one or more of the search terms, may be included in the set of search results At box 239, the search engine application 112 provides the search results to the requesting client 106. As a non-limiting example, the search results may be provided in the form of a network page, which may include links to other network pages. In such embodiments, the search engine application 112 may encode the network page for rendering by the client 106 and sends the network page to the client 106 by way of the network 109. In some embodiments, only a portion of the search results are provided on a particular network page, with additional portions of the search results being provided upon user request. Breaking up the search results in this manner may reduce latency when a large number of search results are involved.

At box 243, the search engine application 112 receives a relevance threshold to be applied to the search results. In some embodiments, the threshold provided by the user is a numeric value which directly corresponds to the range of relevance scores used by the search engine application 112. In such embodiments, if the scores used by the search engine application 112 range from 0 (minimum relevance) to 10 (maximum relevance), then a user-provided threshold value of 5 might instruct the search engine application 112 to filter out all search results that have a relevance score below 5. In other embodiments, the threshold provided by the user is a numeric value, but the number has no direct correspondence to the range of relevance scores used by the search engine application 112. For example, the search engine application 112 may use a range from 0 (minimum relevance) to 50 (maximum relevance), while the user-provided threshold values range from 0 to 10. In such cases, the search engine application 112 performs an appropriate mapping from the user-provided range to the search engine range.

In yet other embodiments, the user threshold refers to a number of search results to be provided in the filtered set. This number may be expressed as an absolute (e.g., provide the 50 search results with the highest relevance score) or may be expressed as a proportion or percentage (e.g., provide the top 25% of relevant search results). In still other embodiments, the user threshold refers to a number of pages of search results to be provided in the filtered set (e.g., provide 5 pages of the most relevant search results).

Next, at box 246, the search engine application 112 applies the search relevance threshold obtained at box 243 to the search results generated at box 236. The result is a refined set of search results, which may have fewer items as compared to the original search results due to the filtering. Application of the relevance threshold involves a comparison of the relevance score for individual search results against the relevance threshold. Results that meet the threshold remain in the search results while results that do not meet the threshold are removed. Put another way, results that meet the threshold are included in the refined set of search results while results that do not meet the threshold are excluded from the refined set of search results.

The relevance score for individual search results may be based in part on one or more factors. For example, the relevance score may be based at least in part on the user supplied relevance indication data 130 (FIG. 1) for individual search results, as determined according to the manner previously described in FIG. 2A. Other relevance indication data 130 may also be used as a basis for the relevance score.

At box 249, the search engine application 112 sorts the refined set of search results produced by the filtering at box 246. In some embodiments, the sort is performed instead by the search client application 133. In still other embodiments, no sorting is performed.

At box 253, the search engine application 112 provides the refined set of search results to the search client application 133. The process of FIG. 2B is then complete.

Figure 3A:
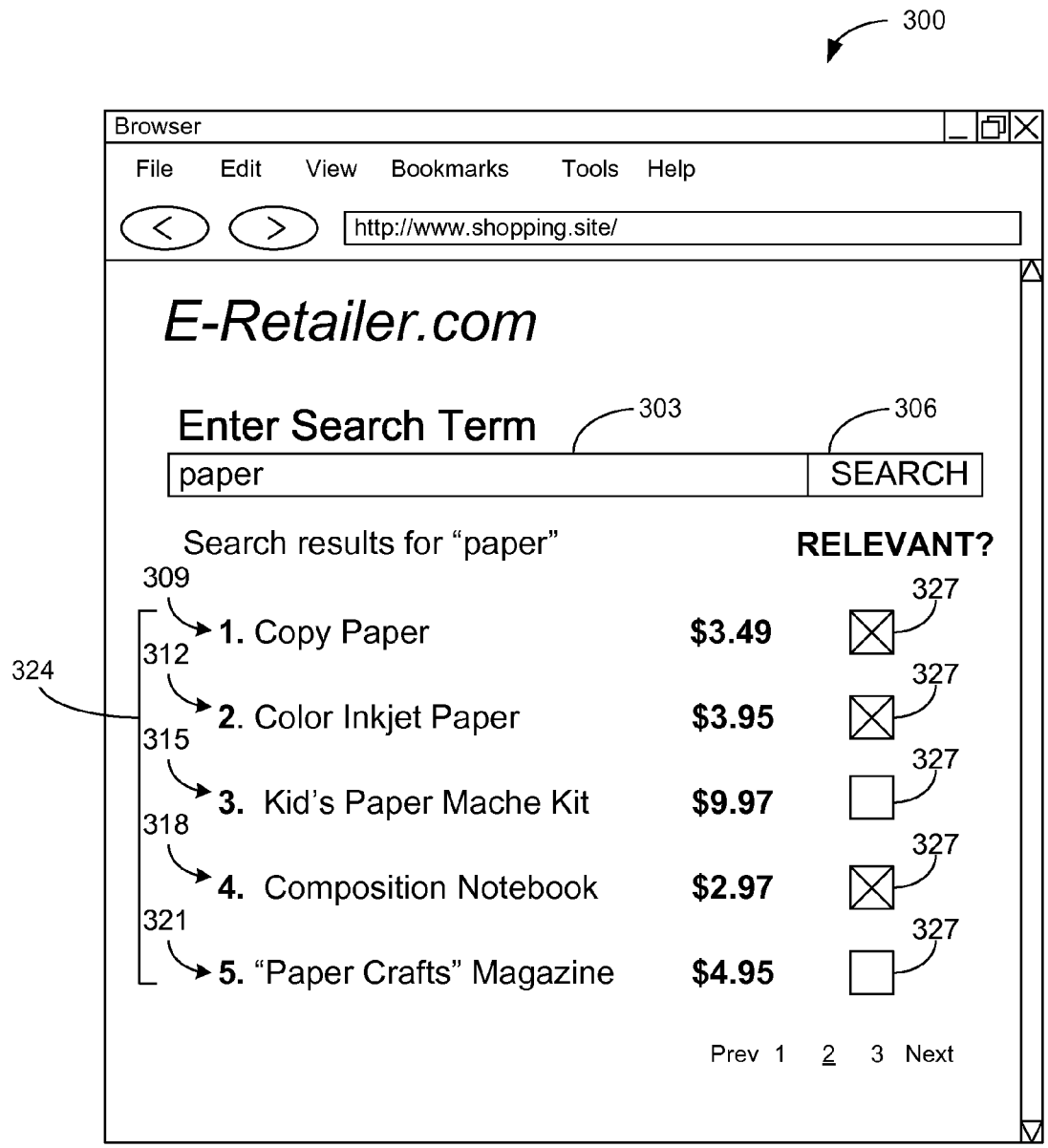
FIGS. 3A-3C are drawings of example user interfaces rendered by a client in the networked environment of FIG. 1 according to various embodiments of the present disclosure.

Turning now to FIG. 3A, shown is a drawing of an example of a user interface 300 rendered by a search client application 133 (FIG. 1) executing on a client 106 (FIG. 1) in the networked environment 100 (FIG. 1) according to various embodiments of the present disclosure. As shown, the user interface 300 represents a network page rendered by the search client application 133 for display to a user. In this embodiment, the search engine application 112 (FIG. 1) is deployed for an online retailer. However, it is understood that a search engine application 112 may be deployed for many different purposes.

In this example, a user has entered the search term "paper" within a search query entry field 303 and has executed an item search by clicking on a search button 306 from a previously presented network page. It is understood, however, that a search query may be entered in a variety of ways such as, for example, by clicking on a link, by depressing a key on a keyboard, and/or by other methods. In particular, the search button 306 may be optional, and a user may send a search query to the search engine application 112 merely by hitting an enter key on a keyboard associated with the client 106. In various embodiments, the search query entry field 303 and the search button 306 may be absent from the user interface 300.

The search results 309, 312, 315, 318, 321 are presented in a list 324. In the example illustrated in FIG. 3A, each entry in the search results includes a title and a price. However, in various embodiments, the search results 309, 312, 315, 318, 321 may include more or less information than that shown in FIG. 3A. For each entry in the search results, the user interface 300 also includes a relevance indication control 327 which allows a user to explicitly indicate whether the user considers a particular search result to be relevant to the previously executed search query. In the example scenario illustrated in FIG. 3A, the user has indicated that search results 309, 312, and 318 ("Multipurpose Copy Paper," "Color Inkjet Paper," and "Composition Notebook") are relevant, and that search results 315 and 321 ("Kid's Paper Mache Kit" and "Paper Crafts Magazine") are irrelevant.

In the example illustrated in FIG. 3A, the relevance indication control 327 is implemented by a checkbox, which allows the user to make a binary choice of "Relevant" (checked) or "Irrelevant" (unchecked). However, other types of user controls may be used. For example, another mechanism for implementing a binary choice is a set of two radio buttons (e.g., labeled "Relevant" and "Irrelevant"). As another example, the relevance indication control 327 may take the form of a multi-value drop box which supports a list of defined values (e.g., "1", "2", "3", "4", and "5"). As yet another example, the relevance indication control 327 may take the form of a slider control which supports a range of values.

The search client application 133 (FIG. 1) executing on the client 106 provides data from the relevance indication controls 327 to the search engine application 112. The search engine application 112 stores this data as relevance indication data 130, and uses the relevance indication data 130 with subsequent searches as described herein. In some embodiments, data from the relevance indication controls 327 is provided to the search engine application 112 as the user interacts with each instance of a relevance indication control 327. In other embodiments, data from all the relevance indication controls 327 is provided to the search engine application 112 when a user takes an action, such as clicking a "Provide Relevance Feedback" button.

In some embodiments, the user interface 300 displayed on the search client application 133 also allows a user to indicate whether the result is relevant/irrelevant to similar search queries. Categories and subcategories in an item catalog may be used as a proxy for similarity. For example, a user viewing search results for "8 MB digital camera" may be given the option of marking "8 MB memory card" as irrelevant for all digital cameras, for all consumer electronics, etc.

In some embodiments, when a user marks a search result as irrelevant, the user interface 300 presents to the user additional information about why the particular search result was included in the list of search results. As one example, the search engine application 112 may provide the attribute responsible for the result's inclusion in the list, and may also provide the merchant provided value for the attribute. For example, if a user marked the Samsung X500 as irrelevant to the query "32 MB digital camera," the user interface 300 may show text explaining that the Memory Size attribute of the Samsung X500 contains "32 MB." Once the user is provided with this information, the user interface 300 may further provide a mechanism for the user to indicate that this particular attribute has an incorrect value.

In some embodiments, the user interface 300 also allows a user to choose a reason for marking a result as irrelevant, for example, "Wrong Category" or "Wrong Subcategory" or "Other." This reason is provided to the search engine application 112, which may take action based on this reason, for example, remove the item from the specific category in the catalog.

Figure 3B:
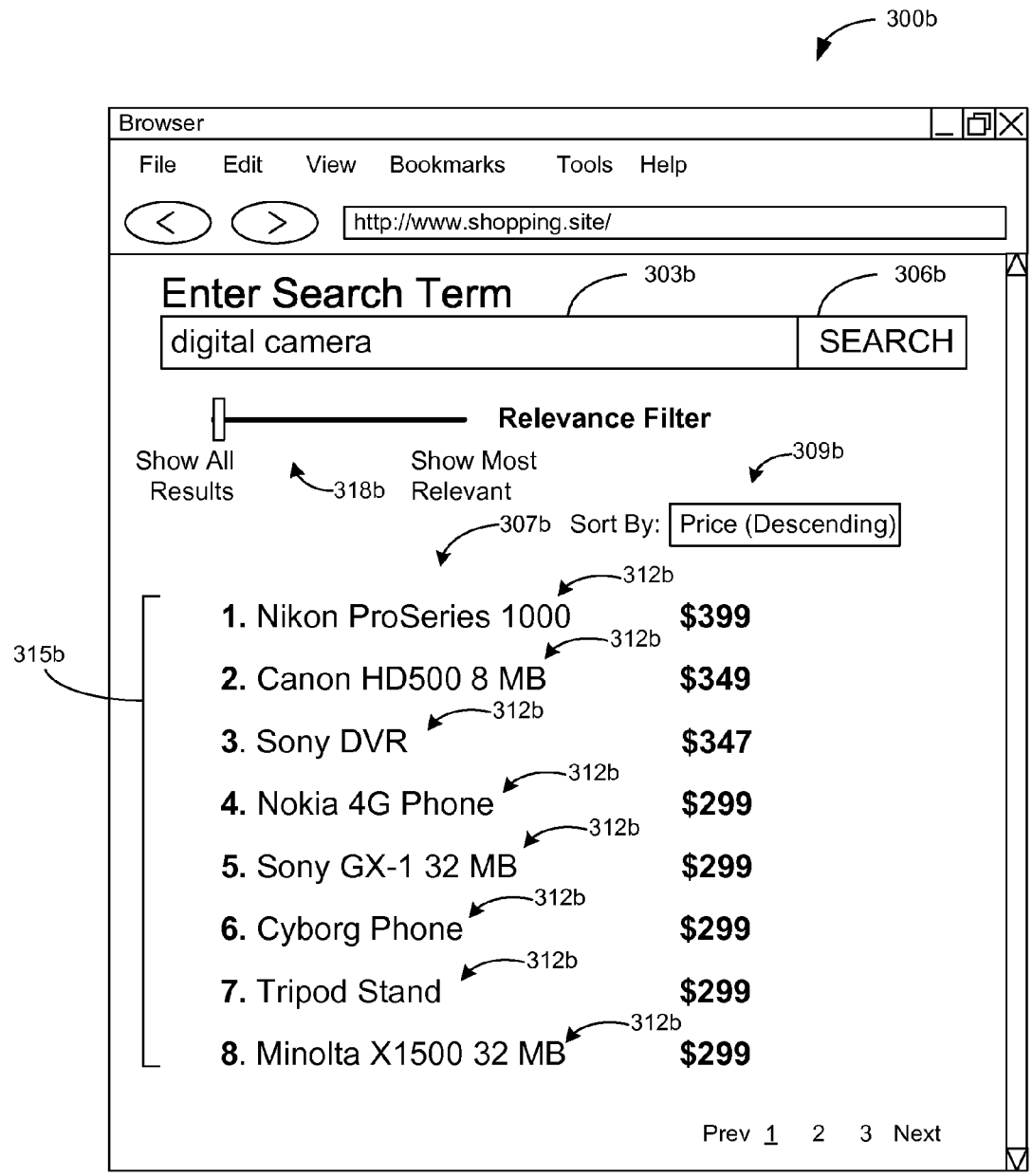
Figure 3C:
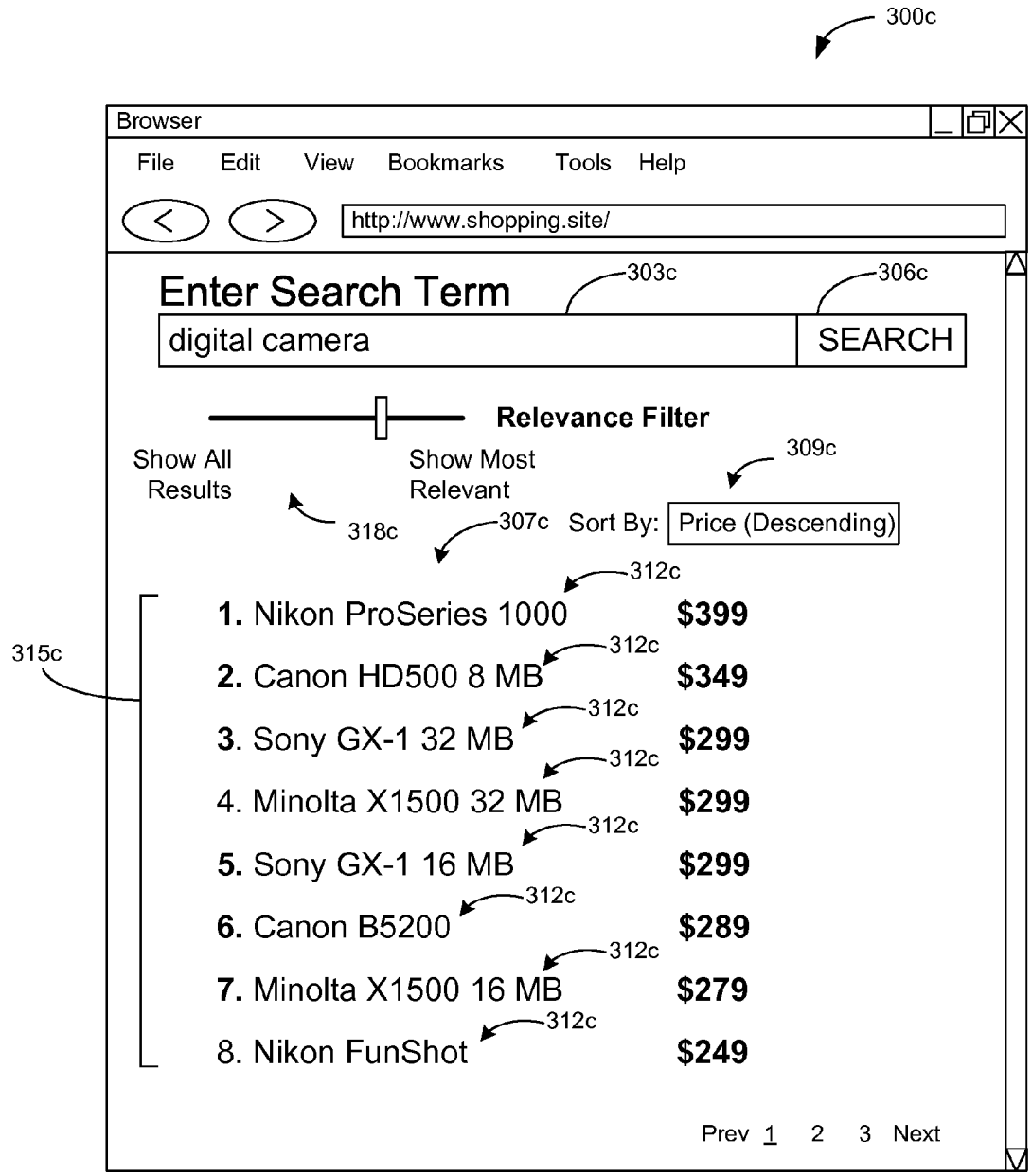

FIGS. 3B and 3C illustrate examples of a user interface 300, denoted herein as 300a and 300b, rendered by a search client application 133 (FIG. 1) executing in a client 106 (FIG. 1) in the networked environment 100 (FIG. 1) according to various embodiments of the present disclosure. As shown, the user interface 300 represents a network page rendered by the search client application 133 for display to a user, after receiving information from the search engine application 112 (FIG. 1). In this embodiment, the search engine application 112 is deployed for an online retailer, and thus the information displayed on the user interface 300 relates to products in an electronic catalog. However, it is understood that a search engine application 112 may be deployed for many different purposes.

Referring to FIG. 3B, the user interface 300b includes a search query entry field 303b, a search button 306b, a search results area 307b, and a sort criteria control 309b. In the example scenario presented in FIG. 3B, a user has entered the search term "digital camera" within the search query entry field 303b from a previously presented network page. It is understood, however, that a search query may be entered in a variety of ways such as, for example, by clicking on a link, by depressing a key on a keyboard, and/or by other methods. In particular, the search button 306b may be optional, and a user may send a search query to the search engine application 112 merely by hitting an enter key on a keyboard associated with the client 106. The search results 312b are presented as a list 315b displayed within the search results area 307b. In the example user interface 300b, each entry in the search results includes a title and a price. However, in various embodiments, the search results 312b may include more or less information than that shown in FIG. 3B.

The sort criteria control 309b allows a user to sort the search results by a specific criteria, such as price, date, most popular, or other suitable criteria. In some embodiments, when a user selects a criteria through the sort criteria control 309b, the search client application 133 provides the criteria to the search engine application 112. In response, the search engine application 112 sorts the search results according to the criteria. The search engine application 112 then provides the sorted set of search results 312b to the search client application 133, and these results are displayed in the user interface 300b. In other embodiments, the search client application 133 sorts the results locally, without interaction with the search engine application 112.

The user interface 300b also includes a relevance threshold control 318b which allows a user to filter the search results by relevance based on the relevance indication data 130. When a user interacts with the relevance threshold control 318b, the search client application 133 provides a corresponding relevance threshold value to the search engine application 112. In response, the search engine application 112 filters the search results according to the relevance threshold, which results in a refined set of search results. The refined set of search results may include fewer results than the full set of results returned by the original query. The search engine application 112 then provides the refined set of search results to the search client application 133, and these results are displayed in the user interface 300b.

The relevance threshold control 318b is implemented by slider bar control in the example user interface 300b, so that a user can specify any value in a range from "Show Most Relevant," based at least in part on previously generated relevance indication data 130, to "Show All." However, other controls may be used, such as check boxes, radio buttons, and/or other user interface elements. For example, the relevance threshold control 318b may be implemented by a control that allows a user to specify that only the top N most relevant search results should be presented. As another example, the relevance threshold control 318b may be implemented by a control that allows a user to specify that only the top N percent of relevant search results should be presented. As another example, the relevance threshold control 318b may be implemented by a control that allows a user to indicate a particular search result as being relevant. As a result, when a subsequent search is performed, or another sort is applied to the current search results only those search results more relevant than the chosen search result are presented.

When the user sets a relevance threshold other than "Show All Results" (i.e., only minimum relevance required), then the relevance threshold and the sort criteria are both applied, producing a set of sorted and refined results. In some embodiments, the sorting occurs before relevance is taken into account. In other embodiments, relevance is taken into account and then sorting is performed.

In the example scenario illustrated in FIG. 3B, the user has interacted with the sort criteria control 309b to sort by price. In addition, the user has interacted with the relevance threshold control 318b to set the relevance threshold to a minimum value. The search thus produces a set of results that are at least minimally relevant to the search query "digital camera," sorted by price. As a result, the user interface 300b includes search results that have some connection to digital cameras, but are probably not digital cameras. For example, search result 312b "Sony DVR" is probably included because a digital video recorder captures digital video, and is thus similar in some ways to the search query "digital camera". Also, result 312b "Nokia 4G Phone" and result 312b "Cyborg Phone" are probably included because cell phones often include cameras. Finally, result 312b "Tripod Stand" is probably included because a tripod is considered a camera accessory.

Because the results are sorted by price, less expensive items that are actually digital cameras may not be immediately visible to a user via a sorted search with minimal relevance. In other words, when a sort criteria is used without taking relevance into account, less relevant items may "crowd out" more relevant items. For example, phones are relatively expensive, and some phones are more expensive than some digital cameras. Therefore, phones such as result 312b ("Nokia 4G Phone") and result 312b ("Cyborg Phone") appear in the first page of search results shown in search list 315b, while less expensive digital cameras do not. This effect can be reduced through the use of sorting in combination with an increased relevance threshold.

Moving on to FIG. 3C, shown is a user interface 300c, which is rendered in response to a user interacting with the relevance threshold control 318c to set the relevance threshold to a value above minimum but below maximum. Thus, the search engine application 112 takes into account the relevance of each search result to the search query "digital camera" so that more than minimum relevance is required, but maximum relevance is not required. As a result, the search engine application 112 uses relevance scores to produce a set of refined search results that excludes some of the search results that are probably not digital cameras. As with FIG. 3B, the sort criteria control 309c is set to sort by price, in descending order.

Using a middle value for the relevance threshold, some items are excluded from the refined set of search results because the search engine application 112 determines these items to be irrelevant to the search query "digital camera," based on the relevance threshold. In particular, result 312c "Sony DVR," 309D "Nokia 4G Phone," result 312c "Cyborg Phone," and result 312c "Tripod Stand" that were included in FIG. 3B are now excluded from the refined set of search results, and are thus not displayed in the list 315c in FIG. 3C. As before, the set of refined search results is also sorted in descending order of price. The exclusion of four results using the relevance threshold frees up space in the search results area 307c to show four other results 312c "Sony GX-1 16 MB", 312c "Canon B5200", 309K "Minolta X15 16 MB", and 312c "Minolta FunShot," which are more relevant to the search query. As can be appreciated by comparing FIGS. 3B and 3C, without the use of an increased relevance threshold, the four results would appear on another page of search results and thus require additional user action by the user to be visible.

By varying the relevance threshold using the relevance threshold criteria control 318c, the user can tune the search to obtain results which are relevant enough, as defined by that particular user. For example, a user interested in camera accessories may notice that camera accessories were excluded by the relevance threshold used in FIG. 3C. The user may then reduce the threshold and perform another search. The user may repeat this adjustment of threshold until the search results include camera accessories. Furthermore, since the results are sorted by price, any relatively expensive camera accessories would appear on the first page of search results, even though camera accessories have a lower relevance score than actual digital camera products.

Figure 4:
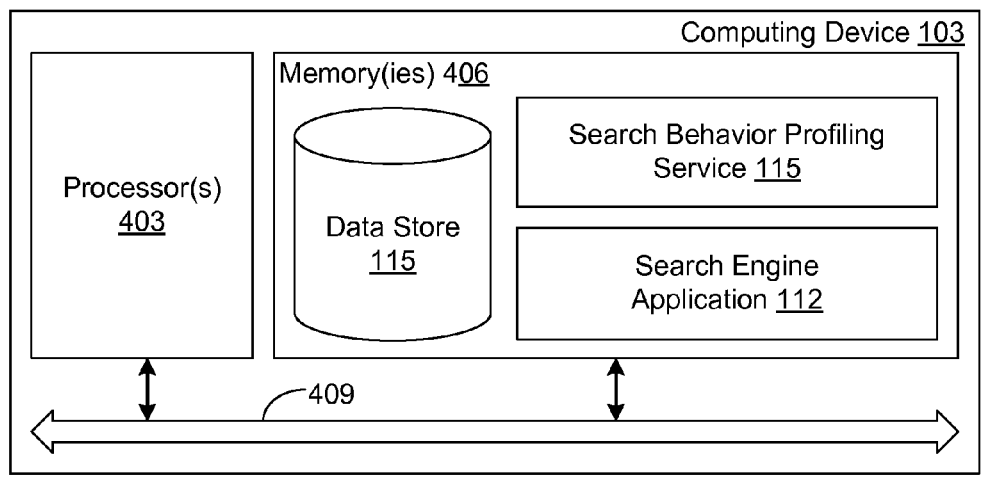
FIG. 4 is a schematic block diagram that provides one example illustration of a computing device employed in the networked environment of FIG. 1 according to various embodiments of the present disclosure.

With reference to FIG. 4, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403 in particular, stored in the memory 406 and executable by the processor 403 are the search engine application 112, the search behavior profiling service 115, and potentially other applications. Also stored in the memory 406 may be a data store 118 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network 109 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the search engine application 112, the search behavior profiling service 115, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 2 shows the functionality and operation of an implementation of portions of the search engine application 112. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowchart of FIG. 2 shows a specific order of execution, it is understood that the order of execution may differ from that which is depicted. For example, the order of execution of two or more blocks may be scrambled relative to the order shown. Also, two or more blocks shown in succession in flowchart of FIG. 2 may be executed concurrently or with partial concurrence. Further, in some embodiments, one or more of the blocks shown in FIG. 2 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the search engine application 112 and the search behavior profiling service 115, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
    code that performs a search using a search query received in a first search request from a client device to produce a first plurality of search results, the search being associated with a catalog and the first plurality of search results corresponding to items listed in the catalog;
    code that provides the first plurality of search results to the client device in response to the first search request;
    code that receives a plurality of relevance indications corresponding to an indication of a respective relevance of at least one of the first plurality of search results, wherein the respective relevance is associated with a relevance score based at least in part upon search behavior data associated with previous submissions of the search query;
    code that determines whether individual ones of the plurality of relevance indications meet a relevance threshold, the relevance threshold set dynamically as a point at which relevance scores associated with the first plurality of search results begin to decline by a predetermined number of score units;
    code that performs a subsequent search using the search query in response to receiving a second search request while excluding individual ones of the first plurality of search results that have a respective relevance score that fails to meet the relevance threshold to produce a second plurality of search results, the second plurality of search results corresponding to items listed in the catalog;
    code that provides the second plurality of search results to the client device in response to the second search request; and
    code that receives a sort criterion from the client device, wherein the sort criterion comprises at least one of a price of the items listed in the catalog or a popularity of the items listed in the catalog;
    code that sorts the second plurality of search results according to the sort criterion; and
    code that provides the sorted second plurality of search results to the client device.

2. The non-transitory computer-readable medium of claim 1, wherein the search behavior data includes a number of occurrences of reaching the at least one of the first plurality of search results via the search query.

3. The non-transitory computer-readable medium of claim 1, wherein the program further comprises code that generates a network page that comprises the first plurality of search results, wherein the code that provides the first plurality of search results to the client device sends the generated network page to the client device.

4. The non-transitory computer-readable medium of claim 1, wherein the program further comprises code that generates a network page that comprises the second plurality of search results, wherein the code that provides the second plurality of search results to the client device sends the generated network page to the client device.

5. A method, comprising:
    obtaining, via at least one of one or more computing devices, a plurality of relevance indications corresponding to an indication of a respective relevance of individual ones of a first plurality of search results corresponding to a search query, wherein the respective relevance is associated with a relevance score based at least in part upon search behavior data associated with previous submissions of the search query;
    determining, via at least one of the one or more computing devices, whether individual ones of the plurality of relevance indications meet a relevance threshold, where the relevance threshold is set dynamically as a point at which relevance scores associated with the first plurality of search results begin to decline by a predetermined number of score units;
    performing, via at least one of the one or more computing devices, a subsequent search to produce a second plurality of search results;

excluding, via at least one of the one or more computing devices, search results that have a relevance score that fails to meet the relevance threshold from the second plurality of search results;

receiving, via at least one of the one or more computing devices, a sort criterion from a client device, wherein the sort criterion comprises at least one of a price of items listed in a product catalog or a popularity of the items listed in the product catalog;

sorting, via at least one of the one or more computing devices, the second plurality of search results according to the sort criterion; and providing, via at least one of the one or more computing devices, the sorted second plurality of search results to the client device.

6. The method of claim 5, wherein a value for the sort criterion is provided by a client application.

7. The method of claim 5, wherein the search behavior data includes a number of occurrences of the plurality of search results being reached via the search query.

8. The method of claim 5, wherein the relevance threshold represents an absolute number of search results.

9. The method of claim 5, wherein the relevance threshold represents a proportion of the search results.

10. The method of claim 5, wherein the relevance threshold represents a number of pages associated with a presentation of the search results.

11. The method of claim 5, wherein excluding, via at least one of the one or more computing devices, search results that have a relevance score that fails to meet the relevance threshold from the second plurality of search results comprises comparing the relevance threshold to the relevance score.

12. The method of claim 5, further comprising flagging, via at least one of the one or more computing devices, search results that have a relevance score that fails to meet the relevance threshold.

13. The method of claim 5, further comprising updating, via at least one of the one or more computing devices, at least a portion of a search index which corresponds to the search query to include the plurality of relevance indications, wherein the search index is associated with a product catalog and the plurality of search results are associated with product detail pages corresponding to items listed in the product catalog.

14. The method of claim 5, further comprising generating, via at least one of the one or more computing devices, a network page comprising the sorted second plurality of search results, wherein providing the sorted second plurality of search results to the client device further comprises sending the generated network page to the client device.

15. The method of claim 5, further comprising providing the first plurality of search results to the client device.

16. A system, comprising:
at least one computing device comprising a processor and a memory; and
an application executable in the at least one computing device, the application comprising:

logic that, in response to receiving a search query in a first search request from a client device, performs a search for the search query to produce a first plurality of search results, the search being associated with a product catalog and the first plurality of search results corresponding to items listed in the product catalog;

logic that provides the first plurality of search results corresponding to the search query to the client device;

logic that receives a plurality of relevance indications corresponding to an indication of a respective relevance of at least one of the first plurality of search results, wherein the respective relevance is associated with a relevance score based at least in part upon search behavior data associated with previous submissions of the search query;

logic that determines whether individual ones of the plurality of relevance indications meet a relevance threshold, the relevance threshold set dynamically as a point at which relevance scores associated with the first plurality of search results begin to decline by a predetermined number of score units;

logic that performs a subsequent search for the search query in response to a second search request to produce a second plurality of search results;

logic that excludes search results that have a relevance score that fails to meet the relevance threshold from the second plurality of search results;

logic that receives a sort criterion from the client device, wherein the sort criterion comprises at least one of a price of items listed in the product catalog or a popularity of the items listed in the product catalog;

logic that sorts the second plurality of search results according to the sort criterion; and logic that provides the sorted second plurality of search results to the client device.

17. The system of claim 16, wherein the search behavior data is based at least in part upon a number of occurrences of reaching the at least one of the first plurality of search results via the search query.

18. The system of claim 16, the application further comprising logic that captures an indication that at least one of the sorted second plurality of search results is relevant, and wherein the logic that excludes removes any search results from the second plurality of search results that are less relevant than the indicated at least one of the sorted second plurality of search results.

19. The system of claim 16, wherein the application further comprises logic that generates a network page that comprises the first plurality of search results, wherein the logic that provides the first plurality of search results to the client device sends the generated network page to the client device.

20. The system of claim 16, wherein the application further comprises logic that generates a network page that comprises the second plurality of search results, wherein the logic that provides the second plurality of search results to the client device sends the generated network page to the client device.

* * * * *